UNITED STATES PATENT OFFICE.

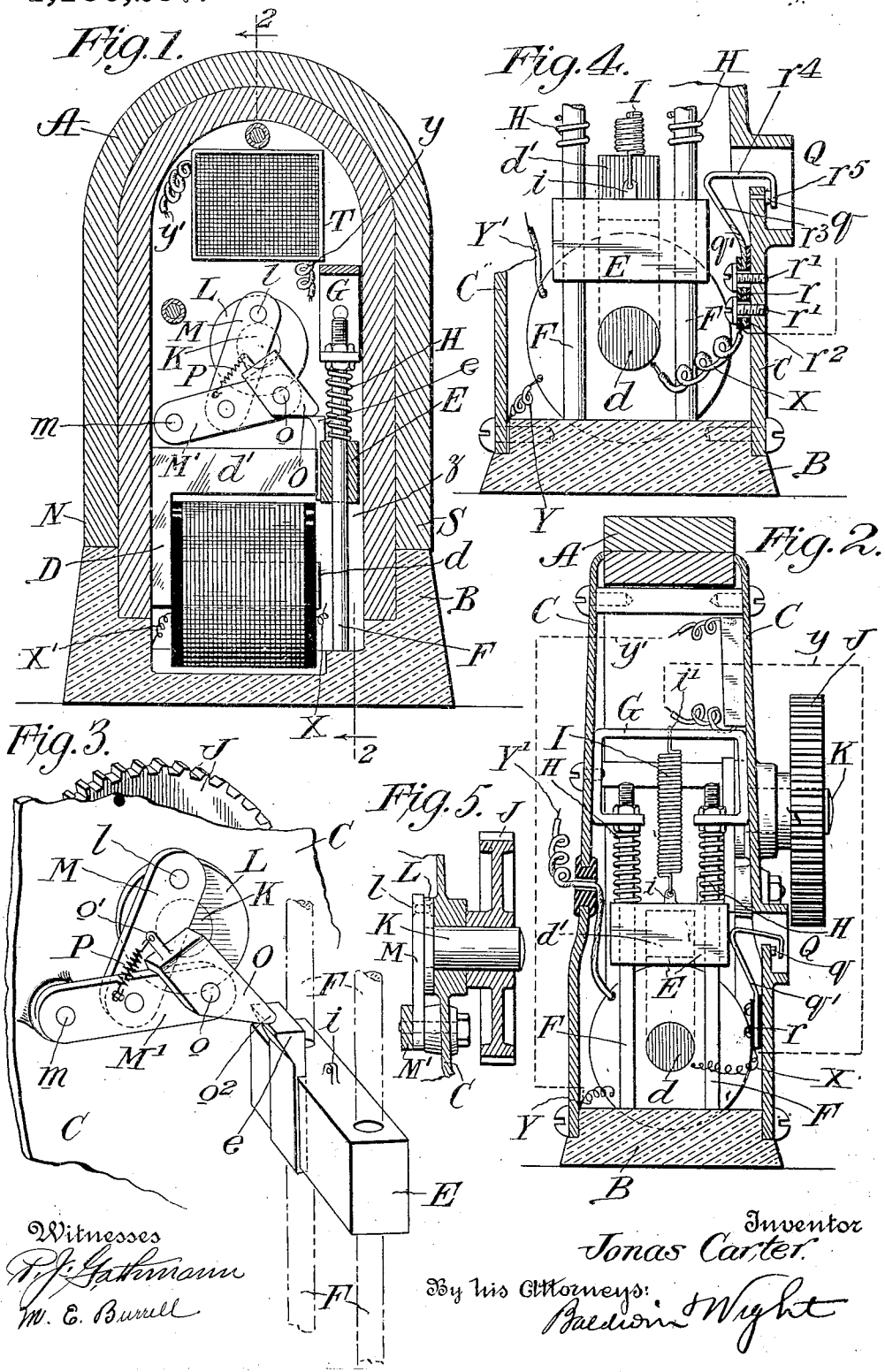
J. CARTER.
GENERATOR FOR INTERMITTENT ELECTRIC CURRENTS.
APPLICATION FILED MAR. 9, 1914.
1,130,257. Patented Mar. 2, 1915.

JONAS CARTER, OF WAUKEGAN, ILLINOIS, ASSIGNOR OF THREE-FOURTHS TO AUGUST LONG, OF WAUKEGAN, ILLINOIS.

GENERATOR FOR INTERMITTENT ELECTRIC CURRENTS.

1,130,257.    Specification of Letters Patent.    Patented Mar. 2, 1915.

Application filed March 9, 1914. Serial No. 823,434.

*To all whom it may concern:*

Be it known that I, JONAS CARTER, a citizen of the United States, residing in Waukegan, in the county of Lake and State of Illinois, have invented certain new and useful Improvements in Generators for Intermittent Electric Currents, of which the following is a specification.

This invention relates to electric current generators of the type in which stationary permanent field magnets are employed in connection with inductors or armatures which are so operated as to induce intermittent currents in coils of wire connected with the field magnets.

The object of the invention is to provide a generator of this class which is simple in construction, is easily operated and will generate high tension intermittent currents when operated either by a rotary or reciprocating engine when moving in either direction and which will produce a spark of full strength for igniting an explosive charge when the engine or crank is first started and when moving at a comparatively slow speed.

The generator constructed in accordance with my invention is as just intimated, especially intended for use in producing sparks in igniting the charges of internal combustion engines, particularly those employed for driving automobiles, but obviously my invention may be used for other purposes.

In carrying out my invention I provide a field magnet comprising permanent magnets of the horse-shoe type and I attach to one of the poles of the magnet a duplex core or pole piece of soft iron, one branch of which carries primary and secondary wire windings which are suitably connected with a circuit breaker and a sparking plug. The inductor or armature is made to reciprocate in front of the duplex core causing a magnetic flux to flow alternately through the pole pieces and to thus generate intermittent electromotive force through the coils, and the circuit breaker is so operated as to break the primary circuit during each reciprocation of the armature and to thus produce a spark in the spark plug which serves to ignite the charge of the engine.

In the accompanying drawings, Figure 1 shows a vertical central section through on electric generator embodying my improvements. Fig. 2 shows a vertical section on the line 2—2 of Fig. 1. Fig. 3 is a detail view in perspective of part of the mechanism for operating the inductor or armature. Fig. 4 is a detail view in section illustrating particularly the circuit breaker and its relation to the armature or inductor. Fig. 5 is a detail view in section showing part of the mechanism for operating the inductor.

The permanent field magnets A are of the horse-shoe type and they are supported on a base B of non-magnetic material, such as brass. These magnets are preferably inclosed by a suitable case C, the details of which are not important. A duplex core or pole piece D of soft iron is attached to one pole N of the magnets, one member $d$ of the core being made to carry primary and secondary windings of insulated wire. The other member $d'$ of the core is disposed parallel with the other member $d$ and both members at their outer ends face the opposite pole S of the field magnets, there being a space $z$ between the ends of the core members and the pole S of the field magnets in which the inductor or armature E reciprocates. Preferably the core or pole piece D is laminated, as shown and as is usual in machines of this class. The armature or inductor E is made of soft iron and it is mounted to reciprocate on brass rods F attached at their lower ends to the base B and connected at their upper ends by a frame G attached to the casing. These rods F serve as guides for the armature and as supports for the springs H which are interposed between the top of the armature and the bottom of the frame G and serve as yielding buffers or cushions to relieve the shock caused by the upward movement of the armature which movement is caused by a spring I attached to the armature at $i$ and to the frame G at $i'$. The armature E is normally held by the spring I in an elevated position opposite the core member $d'$, as shown in Fig. 1, and when the armature is moved to a position opposite the lower core member $d$ the spring is placed under tension.

The armature is moved positively downward by mechanism connected with the crank shaft or with other suitable part of the engine. In the drawings J indicates a spur wheel which may be geared in any suitable way to the engine and which is secured to a short shaft K mounted to revolve in suitable bearings in the casing C and carrying at its end within the casing a disk L provided with a crank pin $l$ to which is pivoted one end of a link M, the opposite end of which is pivoted to the middle portion of a lever M' pivoted at $m$ to the casing. The opposite or outer end of the lever M' carries a dog O which is pivoted to said lever at $o$ and is provided with an arm $o'$ to which is connected one end of a spring P, the opposite end of which is secured to the lever M'. The spring tends to hold the nose $o^2$ of the dog in such position as to engage the armature E when the dog is moved downward, but when the dog is moved upward the spring permits it to pass by the armature. The inner end of the dog O is provided with a projection $o^3$ at right angles to the main body thereof. When the dog is moved downwardly, the projection $o^3$ engages the upper edge of the lever M' and holds the nose of the dog firmly against the armature. The dog or the nose thereof may be made of tempered steel, and the armature is preferably provided with a wearing piece $e$ of hard or tempered steel. When a rotary movement is given to the spur wheel J, the lever M' will be oscillated and when the dog is moved downward it will engage the armature and cause the latter to move to a position in front of the lower core member $d$ at which time the dog slips away from the armature and the latter jumps quickly upward under the influence of the spring I, and later the dog rises, passes by the armature and assumes the position shown in Fig. 1 ready for the next down stroke. These movements and operations are repeated rapidly, the armature being made to reciprocate and pass from one core piece to the other shifting the magnetic flux from the core member carrying the coils to the core member outside the coils in rapid succession.

The circuit breaker Q is shown most clearly in Figs. 2 and 4. It comprises a stationary contact piece $q$ attached to the casing C or otherwise grounded and a movable contact piece $q'$ which normally engages the stationary contact piece $q$, as shown in Fig. 4. The contact piece $q'$ is preferably of the form shown, i. e., it comprises a stem $r$ attached by screws $r'$ in the casing C but insulated therefrom as shown at $r^2$. Above the stem $r$ is an inwardly inclined part $r^3$ which joins a straight outwardly extending horizontal top part $r^4$ from the outer end of which extends downwardly an arm $r^5$ adapted to make contact with the stationary contact piece $q$. The movable contact $q'$ is connected by wire X with one end of the primary coil while the other end of said coil is grounded at X' and thus connected with the stationary contact $q$. The secondary coil is connected to ground at Y and at Y' it may be connected to the sparking plug. I may also employ a condenser T of any suitable kind and which may be connected at $y$ with the insulated or movable member of the circuit breaker and at $y'$ to ground. By the mechanism described a positive downward movement will be given to the armature by the dog O operated in the manner before described and a sudden or quick upward movement or jump will be given to said armature by the spring I. Thus the armature is made to pass from one core member to the other causing magnetic flux to be thus shifted at each reciprocation of the armature and the circuit of the primary windings is broken at each operation.

In practice I have found that the mechanism operates most efficiently. Even a relatively slow movement given to the shaft K will cause the armature to descend and when the latter has moved downward to a sufficient extent it will jump quickly upward and a long spark of sufficient strength will be produced for ignition purposes. For these reasons my generator is particularly serviceable for automobile work. The mechanism is so constructed that the armature may be operated when the shaft K is moved in either direction and such mechanism may be operated by engines of various kinds.

I claim as my invention:—

1. A generator for intermittent electric currents, comprising a permanent magnet having a duplex core or pole piece attached to one pole thereof, wire coils on one member of the core, an armature adapted to reciprocate between the opposite pole of the magnet and the two members of the core, and means for actuating the armature.

2. A generator for intermittent electric currents, comprising a permanent magnet having a duplex core or pole piece attached to one pole thereof, wire coils on one member of the core, an armature adapted to reciprocate between the opposite pole of the magnet and the two members of the core, power operated means for moving the armature in one direction, and a spring for moving it in the opposite direction.

3. A generator for intermittent electric currents, comprising a permanent magnet having a duplex core or pole piece attached to one pole thereof, wire coils on one member of the core, an armature adapted to reciprocate between the opposite pole of the magnet and the two members of the core, guides for the armature, a power driven shaft, a crank carried thereby, a link connected with the crank, a lever jointed to the link, a dog carried by the lever and adapted to engage the armature, and a spring for moving the armature in one direction after being moved in the opposite direction by the dog.

4. The combination of a non-magnetic base, a permanent horse-shoe magnet attached thereto, a duplex pole piece attached to one pole of the magnet, an armature adapted to reciprocate between the opposite pole of the magnet and the two members of the core, guide posts for the armature, a spring for moving the armature in one direction, cushioning springs on the guide posts for the armature, and power driven devices for moving the armature and putting said before mentioned spring under tension.

5. A generator for intermittent electric currents, comprising a permanent magnet having a duplex core or pole piece attached to one pole thereof, wire coils on one member of the core, an armature adapted to reciprocate between the opposite pole of the magnet and the two members of the core, and a circuit breaker included in the circuit of the coils and which is operated by the armature as it reciprocates.

6. The combination of a permanent horseshoe magnet, a core attached to one pole of the magnet, an armature adapted to reciprocate at right angles to the axis of said core between the opposite pole of the magnet and the core, a spring for moving the armature in one direction, and power driven devices for moving the armature in the opposite direction.

7. The combination of a permanent horseshoe magnet, a pole piece attached to one pole of the said magnet, an armature adapted to reciprocate at right angles to the axis of said core between the opposite pole of the magnet and the pole piece, primary and secondary windings on said pole piece, a circuit breaker included in the primary circuit and actuated by the armature, and a condenser also included in the coil circuits.

In testimony whereof, I have hereunto subscribed my name.

JONAS CARTER.

Witnesses:
 JOHN A. PELTO,
 A. F. BEAUTRIN.